(12) United States Patent
Kida

(10) Patent No.: US 6,381,808 B1
(45) Date of Patent: May 7, 2002

(54) HINGE USED FOR NOTE-TYPE COMPUTER

(75) Inventor: Minoru Kida, 891 Kamishirane-cho, Asahi-ku, Yokohama-shi, Kanagawa (JP)

(73) Assignees: Minoru Kida; Himu Electro Co., Ltd., both of Niigata (JP); a part interest ( * ) Notice: Subject to any disclaimer, the term of this patent is extended or adjusted under 35 U.S.C. 154(b) by 0 days.

(21) Appl. No.: 09/594,036

(22) Filed: Jun. 15, 2000

(30) Foreign Application Priority Data

Jun. 16, 1999 (JP) .............................. 11-206621

(51) Int. Cl.$^7$ .............................................. E05C 17/64
(52) U.S. Cl. ........................................ 16/340; 16/342
(58) Field of Search .......................... 16/340, 342, 337, 16/273, 274; 403/71, 70, 68, 84, 114, 120; 361/680–683, 807

(56) References Cited

U.S. PATENT DOCUMENTS

| | | | | |
|---|---|---|---|---|
| 5,239,731 A | * | 8/1993 | Lu ................................ | 16/342 |
| 5,333,356 A | * | 8/1994 | Katagiri ......................... | 16/340 |
| 5,388,308 A | * | 2/1995 | Meeuwissen ................. | 16/340 |
| 5,632,066 A | * | 5/1997 | Huong .......................... | 16/342 |
| 5,715,576 A | * | 2/1998 | Liu ............................... | 16/342 |
| 5,832,566 A | * | 11/1998 | Quek et al. .................... | 16/342 |
| 6,085,388 A | * | 7/2000 | Kaneko ........................ | 16/342 |
| 6,101,676 A | * | 8/2000 | Wahl et al. .................... | 16/342 |

FOREIGN PATENT DOCUMENTS

JP  3040939  6/1997

* cited by examiner

Primary Examiner—Chuck Y. Mah
(74) Attorney, Agent, or Firm—Young & Thompson

(57) ABSTRACT

There is provided a hinge rotatably connecting a first body to a sacond body, including (a) a main body to be fixed onto the first body, the main bodyr including a hollow cylindrical portion horizontally extending, (b) a rotation shaft fixed at one end to the second body and rotatably connected at the other end to the main body, (c) an outer collar connected to the hollow cylindrical portion of the main body in a direction in which the hollow cylindrical portion extended extends and (d) a frictional collar filling space therewith between the rotation shaft and both the outer collar and the hollow cylindrical portion. For instance, the first body may be a keyboard, and the second body may be a display screen in a note-type computer. The hinge ensures smooth rotation between the first and second bodies, and further ensures a greater upper limit in the rotation number than that of a conventional hinge used in a note-type computer.

19 Claims, 2 Drawing Sheets

HINGE USED FOR NOTE-TYPE COMPUTER

BACKGROUND OF THE INVENTION

1. Field of the Invention

The invention relates to a hinge used in a note-type computer, and more particularly to a hinge used for rotatably connecting a keyboard to a display screen.

2. Description of the Related Art

FIG. 1 is a cross-sectional view of a conventional hinge used in a note-type computer.

The illustrated hinge is used for rotatably connecting a display screen 10 to a keyboard 11. The hinge is comprised of a L-type support 12, a rotation shaft 13, and a nut 14.

The L-type support 12 is fixed onto the keyboard 11 by means of a bolt 15. The L-type support 12 is formed with a through-hole (not illustrated) at a standing portion 12a.

The rotation shaft 13 is fixed at one end to the display screen 10, and extends at the other end through the through-hole of the standing portion 12a of the L-type support. The rotation shaft 13 is formed at the other end with a threaded portion 13a. The rotation shaft 13 is rotatably fixed to the standing portion 12a of the L-type support 12 by threading the nut 14 into the threaded portion 13a of the rotation shaft 13 with a first washer 16, a wave spring 17 and a second washer 18 all being sandwiched between the standing portion 12a and the nut 14.

A third washer 19 is inserted around the rotation shaft 13 between the standing portion 12a of the L-type support 12 and the display screen 10.

In operation, the rotation shaft 13 is rotated relative to the keyboard 11. For instance, the rotation shaft 13 may be rotated such that the display screen 10 overlaps the keyboard 11, or the rotation shaft 13 may be rotated such that the display screen 10 perpendicularly stands relative to the keyboard 11.

FIG. 2 is a cross-sectional view of another conventional hinge used in a note-type computer. The illustrated hinge is suggested in Japanese Utility Model No. 3040939 published on Sep. 5, 1997 in Japan.

The illustrated hinge is used for rotatably connecting a display screen 20 to a keyboard 21. The hinge is comprised of a support 22 having a cylindrical portion 22a, a rotation shaft 23, a nut 24, and a spring 25.

The support 22 is fixed onto the keyboard 21 by means of a bolt 29. The support 22 is formed with a through-hole 26 throughout the cylindrical portion 22a in a length-wise direction thereof. The through-hole 26 is comprised of a tapered hole 26a and a straight hole 26b.

The rotation shaft 23 is fixed at one end to the display screen 20, and extends through the through-hole 26 of the support 22. The rotation shaft 23 is designed to have a tapered portion 23a and a straight portion 23b in conformity with the tapered hole 26a and the straight hole 26b. The rotation shat 23 is formed at the other end with a threaded portion 23c. The rotation shaft 23 is rotatably fixed to the support 22 by threading the nut 24 into the threaded portion 23c of the rotation shaft 23 with the spring 25 and a washer 27 both being sandwiched between the support 22 and the nut 24.

A frictional sheet 28 is adhered to an inner surface of the tapered hole 26a such that the frictional sheet 28 provides frictional force to the tapered portion 23a of the rotation shaft 23.

A hinge used in a note-type computer has been required to be smaller and smaller in size and lighter and lighter in weight in order to ensure a user to readily carry a note-type computer.

On the other hand, a display screen has been designed to be wider and wider to ensure a user to readily observe what is displayed. Accordingly, a display screen increases its weight.

Thus, a hinge used in a note-type computer is now required to be small in size, light in weight, and have a strength sufficient to support a display screen which gradually increases its weight.

However, in the conventional hinges illustrated in FIGS. 1 and 2, since the L-type support 12 and the support 22 are formed by zinc die-casting. Accordingly, they are heavy, and cannot be formed thin because of its low strength.

Hence, the conventional hinges cannot meet with the above-mentioned requirement.

SUMMARY OF THE INVENTION

In view of such a problem in the conventional hinges, it is an object of the present invention to provide a hinge used in a note-type computer which hinge is smaller and lighter than the conventional one, and has a greater strength than that of the conventional one to thereby ensure a greater upper limit in the rotation number than that of the conventional one.

There is provided a hinge rotatably connecting a first body to a second body, including (a) a main body to be fixed onto the first body, the main body including a hollow cylindrical portion horizontally extending, (b) a rotation shaft fixed at one end to the second body and rotatably connected at the other end to the main body, and (c) a frictional collar filling space therewith between the rotation shaft and the hollow cylindrical portion of the main body.

There is further provided a hinge rotatably connecting a first body to a second body, including (a) a main body to be fixed onto the first body, the main body including a hollow cylindrical portion horizontally extending, (b) a rotation shaft fixed at one end to the second body and rotatably connected at the other end to the main body, (c) an outer collar connected to the hollow cylindrical portion of the main body in a direction in which the hollow cylindrical portion extends, and (d) a frictional collar filling space therewith between the rotation shaft and both the outer collar and the hollow cylindrical portion.

It is preferable that the hinge further includes a nut, and wherein the main body further includes a wall portion covering one of sides of the hollow cylindrical portion therewith and being formed with a through-hole, in which case, the rotation shaft passes through the through-hole of the wall portion at the other end, and rotatably fixed to the wall portion by means of the nut.

It is preferable that the cylindrical hollow portion has a reduced diameter portion at a distal end thereof and the outer collar is a cylindrical collar having an inner diameter equal to an outer diameter of the reduced diameter portion of the cylindrical hollow portion.

It is preferable that the cylindrical hollow portion has at least one stepped portion on the reduced diameter portion, the stepped portion having a greater outer diameter than an outer diameter of the reduced diameter portion, in which case, the outer collar is formed at one end thereof with a cut-out into which the stepped portion is to be fit.

For instance, the stepped portion may be rectangular in shape.

It is preferable that the cylindrical hollow portion has two stepped portions, and the outer collar is formed at one end thereof with two cut-outs into which the stepped portions are to be fit, in which case, the two stepped portions are spaced away from each other preferably by 180 degrees.

It is preferable that the rotation shaft has a tapered portion surrounded by the outer collar and the cylindrical hollow portion.

For instance, the outer collar is made of stainless steel, the frictional collar is made of plastic, and the rotation shaft is made of stainless steel.

It is preferable that the frictional collar is made of material having spring characteristic.

It is preferable that the nut provides a resistance of about 7 kg/cm to said rotation shaft, when the rotation shaft is rotated.

It is preferable that the rotation shaft is formed at outer surface of the tapered portion with at least one recess in which lubricant is pooled, in which case, the recess extends preferably in a length-wise direction of the rotation shaft.

As an alternative, the frictional collar may be formed at inner surface at which the frictional collar makes contact with the tapered portion of the rotation shaft, with at least one recess in which lubricant is pooled, in which case, the recess extends preferably in a length-wise direction of the rotation shaft.

For instance, the first body may be a keyboard, and the second body may be a display screen in a note-type computer.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENT

A preferred embodiment in accordance with the present invention will be explained hereinbelow with reference to drawings.

Figure 3:
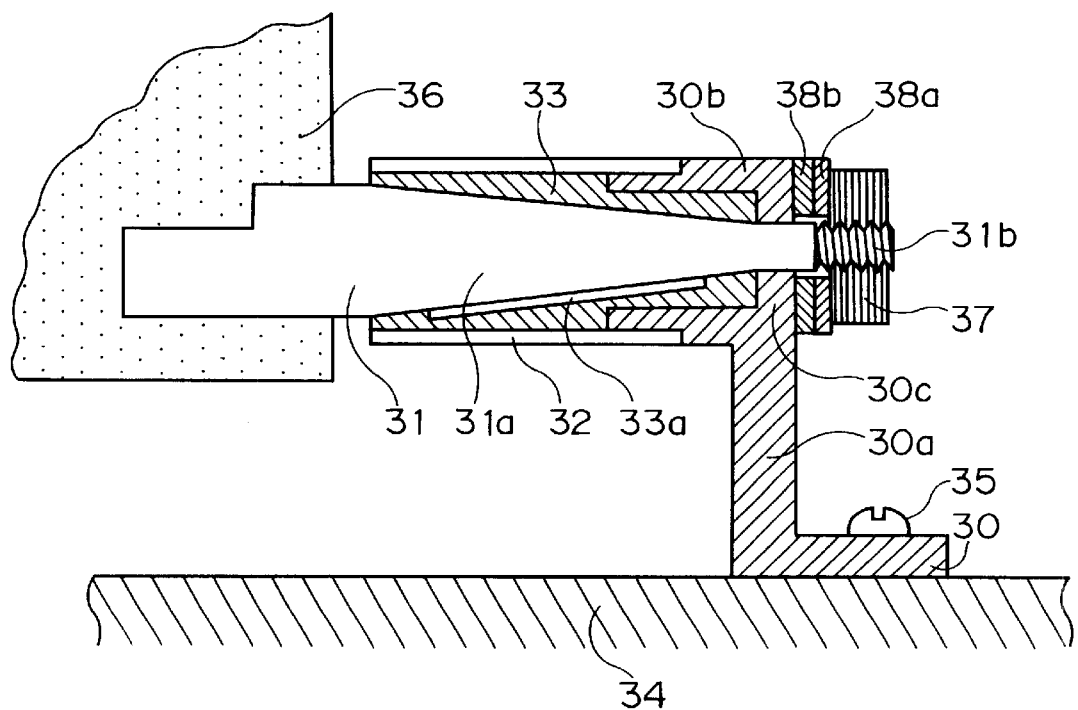
FIG. 3 is a cross-sectional view of a hinge in accordance with the preferred embodiment of the present invention.

FIG. 3 is a cross-sectional view of a hinge in accordance with the preferred embodiment. The hinge rotatably connects a keyboard to a display screen in a note-type computer.

As illustrated in FIG. 3, a hinge in accordance with the embodiment is comprised of a main body 30, a rotation shaft 31, an outer collar 32 and a frictional collar 33.

The main body 30 is designed to have a L-type support 30a and a hollow cylindrical portion 30b horizontally extending from the L-type support 30a and surrounded by the outer collar 32 and the cylindrical hollow portion 30b. The main body 30 is fixed at the L-type support 30a onto a keyboard 34 by means of a screw 35.

The main body 30 further includes a wall portion 30c covering a side of the hollow cylindrical portion 30b therewith. The wall portion 30c is formed centrally with a through-hole.

The rotation shaft 31 is fixed at one end to a display screen 36. The rotation shaft 31 is comprised of a tapered portion 31a and a threaded portion 31b.

The threaded portion 31b of the rotation shaft 31 is inserted through the through-hole of the wall portion 30c, and is rotatably fixed to the wall portion 30c of the main body 30 by threading a nut 37 to the threaded portion 31b with first and second washers 38a and 38b being sandwiched between the wall portion 30c and the nut 37.

Figure 4:
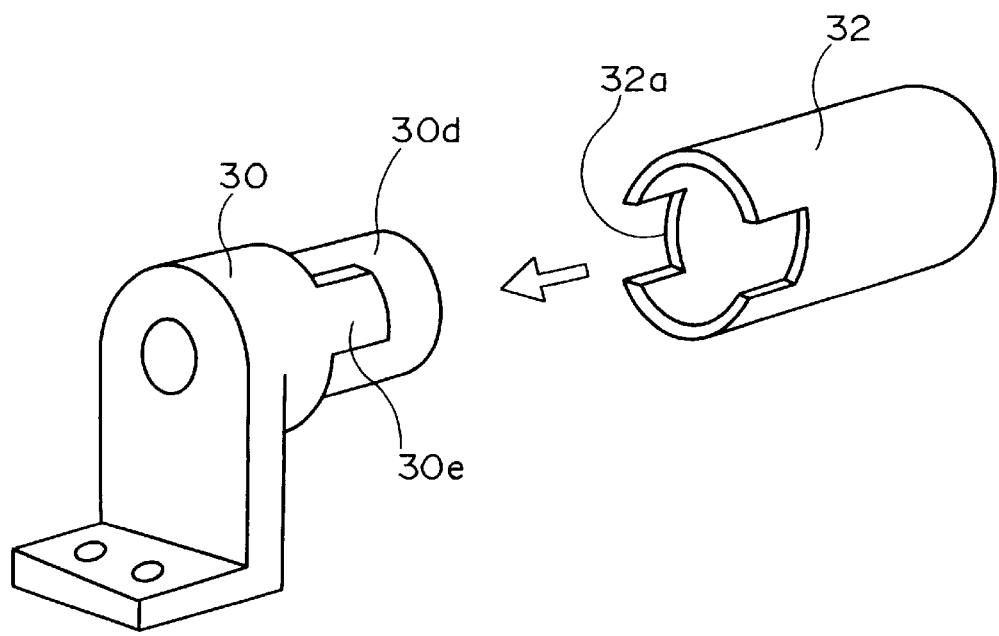
FIG. 4 is a perspective view of a support and a collar.

FIG. 4 is a perspective view of the main body 30 and the outer collar 32.

As illustrated in FIG. 4, the cylindrical hollow portion 30b has a reduced diameter portion 30d at a distal end thereof, and two stepped portions 30e formed on the reduced diameter portion 30d. Each of the stepped portions 30e has a greater outer diameter than an outer diameter of the reduced diameter portion 30d. The two stepped portions 30e are spaced away from each other by 180 degrees around an axis of the cylindrical hollow portion 30b.

Each of the stepped portions 30e is rectangular in shape.

The outer collar 32 is cylindrical in shape, and has an inner diameter equal to an outer diameter of the reduced diameter portion 30d of the cylindrical hollow portion 30b. Accordingly, the reduced diameter portion 30d can be fit into the outer collar 32.

The outer collar 32 is formed at one end thereof with two cutouts 32a into which the stepped portions 30e are to be fit. Hence, when the reduced diameter portion 30d is fit into the outer collar 32, the stepped portions 30e are also fit into the cutouts 32a.

The frictional collar 33 fills a space therewith between the rotation shaft 31 and both the outer collar 32 and the hollow cylindrical portion 30b.

The outer collar 32 is made of stainless steel. The frictional collar 33 is made of plastic. The rotation shaft 31 is made of stainless steel.

Though not illustrated, the rotation shaft 31 is formed at outer surface of the tapered portion 31a with a plurality of recesses extending in a length-wise direction of the rotation shaft 31. Lubricant such as grease is pooled in the recesses.

As an alternative, the frictional collar 22 may be formed at inner surface at which the frictional collar 33 makes contact with the tapered portion 31a of the rotation shaft 31, with a plurality of recesses 33a, in which lubricant such as grease is pooled.

The hinge in accordance with the embodiment is assembled as follows.

First, the main body 30 is fixed onto the keyboard 34. Then, the rotation shaft 31 is fixed to the display screen 36.

Then, the outer collar 32 is inserted into the cylindrical hollow portion 30b of the main body 30, and the frictional collar 33 is inserted into both the outer collar 32 and the cylindrical hollow portion 30b.

Then, the rotation shaft 31 is inserted into the frictional collar 33 such that the threaded portion 31b projects beyond the wall portion 30c of the main body 30. Then, the nut 37 is threaded into the threaded portion 31b with the first and second washers 38a and 38b being sandwiched therebetween.

In operation, the display screen 36 is rotated relative to the keyboard 34 through the hinge in accordance with the embodiment. For instance, the display screen 36 may be rotated such that the display screen 36 overlaps the keyboard 34, or the display screen 36 may be rotated such that the display screen 36 perpendicularly stands relative to the keyboard 34.

The hinge in accordance with the embodiment provides an advantage as follows.

In accordance with the embodiment, if the rotation shaft 31 is fastened by the nut 37 by a distance of 0.6 mm to 0.8 mm, the nut 37 provides a frictional resistance of about 7 kgf/cm (6860 n/m) to the rotation shaft 31, when the rotation shaft 31 is rotated. According to the experiments having been carried out by the inventor, such a frictional resistance of about 7 kgf/cm is most suitable for a user to open or close the display screen 36.

Figure 1:
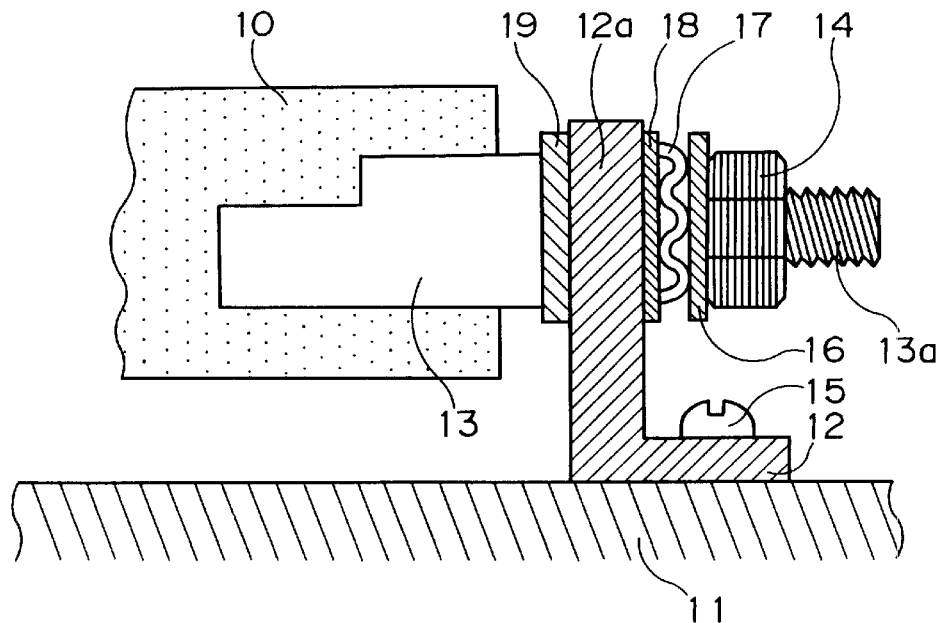
FIG. 1 is a cross-sectional view of a conventional hinge used in a note-type computer.
Figure 2:
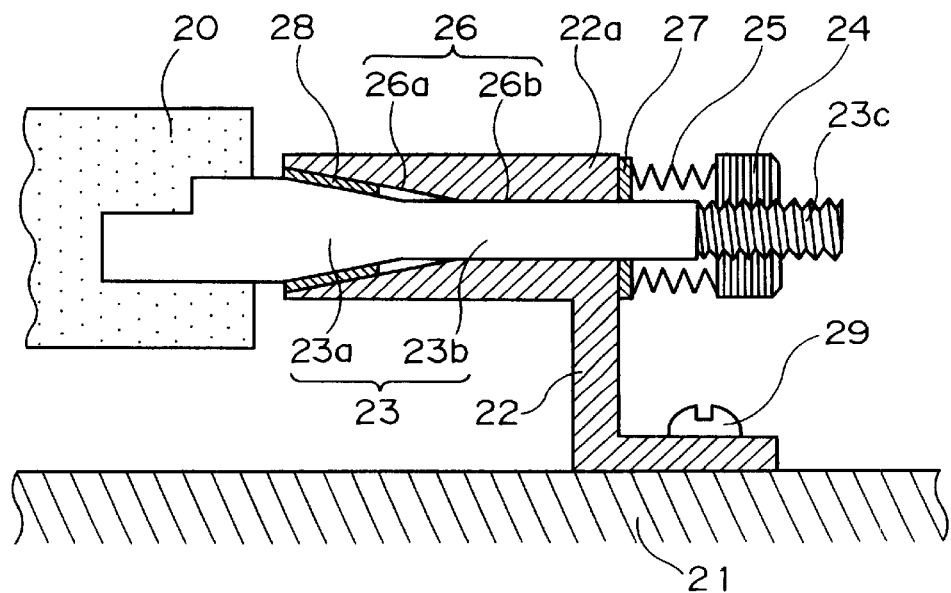
FIG. 2 is a cross-sectional view of another conventional hinge used in a note-type compute.

In addition, if the rotation shaft 21 is fastened by the nut 37, the frictional collar 33 tries to radially expand. However, the outer collar 32 prevents the frictional collar 33 from expanding. As a result, a repulsive force is generated in the frictional collar 33, and hence, the frictional collar 33 could have spring characteristic. Hence, the hinge in accordance with the embodiment makes it no longer necessary to employ a spring such as the spring 25 illustrated in FIG. 2.

As mentioned above, when the rotation shaft 31 is fastened by the nut 37, there is generated a stress. Since the outer collar 32 is made of stainless, the outer collar 32 could have a smaller thickness than a thickness of an outer collar made by zinc die-casting for enduring the stress. For instance, the outer collar 32 has a thickness of 0.4 mm. In contrast, if the outer collar 32 is made by zinc die-casting, the outer collar 32 would have to have a thickness of 1.2 mm. As a result, the hinge in accordance with the embodiment can be made smaller in size.

As mentioned earlier, lubricant is pooled at an outer surface of the rotation shaft 31 and/or an inner surface of the frictional collar 33.

The lubricant ensures smooth rotation of the rotation shaft 31, because a thin lubricant layer is formed between the rotation shaft 31 and the frictional collar 33 each time the rotation shaft 31 rotates.

In addition, the lubricant ensures that the frictional collar 33 is not worn out. This further ensures a greater upper limit in the number of rotation of the rotation shaft 31 than that of a rotation shaft in the conventional hinge, and constancy of the resistance of 7 kg/cm provided to the rotation shaft 31.

Though the outer collar 32 and the main body 30 are separate parts in the embodiment, it should be noted that the outer collar 32 and the main body 30 may be formed integral with each other.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 11-206621 filed on Jun. 16, 1999 including specification, claims, drawings and summary is incorporated herein by reference in its entirety.

What is claimed is:

1. A hinge rotatably connecting a first body to a second body, comprising:
   (a) a main body to be fixed onto said first body, said main body including a hollow cylindrical portion horizontally extending;
   (b) a rotation shaft fixed at one end to said second body and rotatably connected at the other end to said main body;
   (c) an outer collar connected to said hollow cylindrical portion of said main body in a direction in which said hollow cylindrical portion extends; and
   (d) a frictional collar filling space therewith between said rotation shaft and both said outer collar and said hollow cylindrical portion.

2. The hinge as set forth in claim 1, further comprising a nut, and wherein said main body further includes a wall portion covering one of sides of said hollow cylindrical portion therewith and being formed with a through-hole,
   said rotation shaft passing through said through-hole of said wall portion at the other end, and rotatably fixed to said wall portion by means of said nut.

3. The hinge as set forth in claim 2, wherein said frictional collar provides a resistance of about 7 kg/cm to said rotation shaft, when said rotation shaft is rotated.

4. The hinge as set forth in claim 1, wherein said cylindrical hollow portion has a reduced diameter portion at a distal end thereof and said outer collar is a cylindrical collar having an inner diameter equal to an outer diameter of said reduced diameter portion of said cylindrical hollow portion.

5. The hinge as set forth in claim 4, wherein said cylindrical hollow portion has at least one stepped portion on said reduced diameter portion, said stepped portion having a greater outer diameter than an outer diameter of said reduced diameter portion,
   said outer collar being formed at one end thereof with a cutout into which said stepped portion is to be fit.

6. The hinge as set forth in claim 5, wherein said stepped portion is rectangular in shape.

7. The hinge as set forth in claim 5, wherein said cylindrical hollow portion has two stepped portions, and said outer collar is formed at one end thereof with two cut-outs into which said stepped portions are to be fit.

8. The hinge as set forth in claim 7, wherein said two stepped portions are spaced away from each other by 180 degrees.

9. The hinge as set forth in claim 7, wherein said two stepped portions are rectangular in shape.

10. The hinge as set forth in claim 1, wherein said rotation shaft has a tapered portion surrounded by said outer collar and said cylindrical hollow portion.

11. The hinge as set forth in claim 10, wherein said frictional collar is formed at inner surface at which said frictional collar makes contact with said tapered portion of said rotation shaft, with at least one recess in which lubricant is pooled.

12. The hinge as set forth in claim 11, wherein said recess extends in a length-wise direction of said rotation shaft.

13. The hinge as set forth in claim 1, wherein said outer collar is made of stainless steel.

14. The hinge as set forth in claim 1, wherein said frictional collar is made of plastic.

15. The hinge as set forth in claim 1, wherein said frictional collar is made of material having spring characteristic.

16. The hinge as set forth in claim 1, wherein said rotation shaft is made of stainless steel.

17. The hinge as set forth in claim 1, wherein said rotation shaft is formed at outer surface of said tapered portion with at least one recess in which lubricant is pooled.

18. The hinge as set forth in claim 17, wherein said recess extends in a length-wise direction of said rotation shaft.

19. The hinge as set forth in claim 1, wherein said first body is a keyboard, and the second body is a display screen in a note-type computer.

* * * * *